June 21, 1938.  G. A. HUMASON  2,121,634
SPEAR
Filed Dec. 15, 1936  2 Sheets-Sheet 1

Inventor
Granville A. Humason.
By Jesse R. Stone & Lester B. Clark
Attorneys

June 21, 1938.  G. A. HUMASON  2,121,634
SPEAR
Filed Dec. 15, 1936  2 Sheets-Sheet 2

Inventor
Granville A. Humason.
Jesse R. Stone
Lester B. Clark
By
Attorneys

Patented June 21, 1938

2,121,634

UNITED STATES PATENT OFFICE 2,121,634

SPEAR

Granville A. Humason, Houston, Tex.

Application December 15, 1936, Serial No. 115,932

2 Claims. (Cl. 294—96)

My invention relates to spears or similar devices by means of which one pipe may be introduced into another and engaged therewith to prevent relative upper movement of the inner pipe relative to the outer pipe.

My device is adapted particularly as a spear of the bulldog type but may be employed generally to anchor an inner pipe within an outer pipe so that the inner pipe may be prevented from moving upwardly in the outer pipe.

It is an object of the invention to provide a device of this kind which may be engaged with the outer pipe and again released positively and accurately in a minimum of operating time.

Another object of the invention is to provide a pipe engaging spear which may be made of simple and economical construction not easily broken.

Another object of the invention is to provide a releasing spear which may be operated by a simple downward screwing of the inner pipe.

Further objects will be brought out in connection with the description of my device and reference is made to the drawings herewith illustrating the preferred form of the invention.

Figure 1:
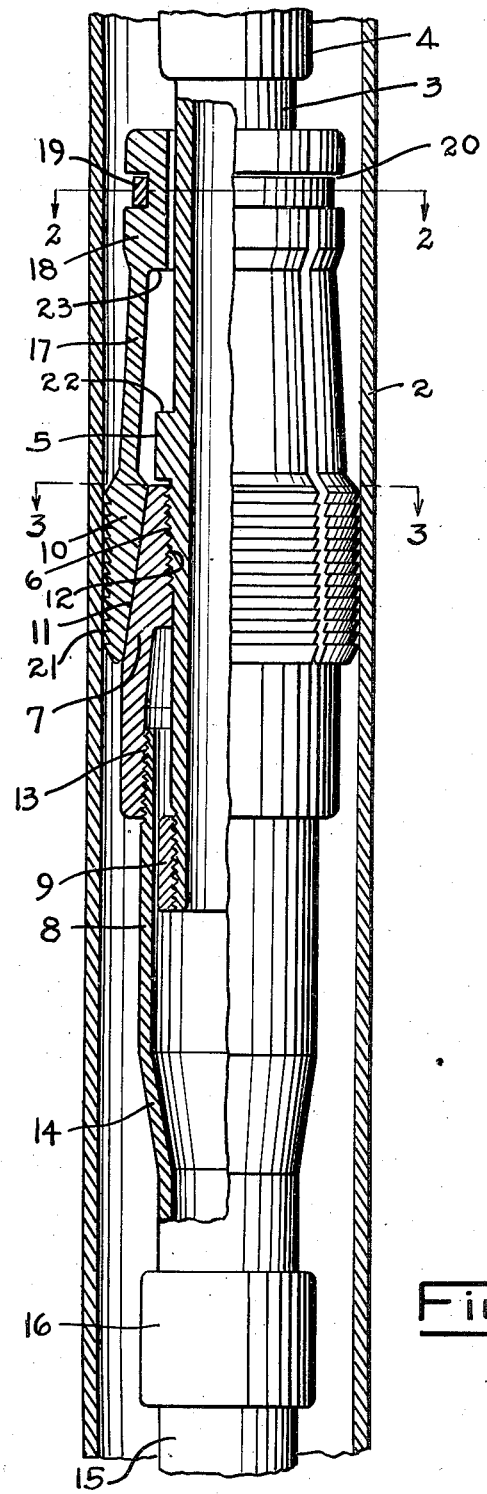
Fig. 1 is a side view partly in longitudinal section of a device embodying my invention.
Figure 2:
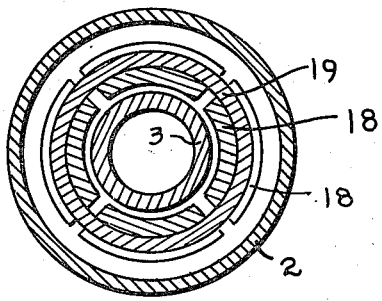
Fig. 2 is a transverse section on the plane 2—2 of Fig. 1.

In Fig. 1, I have shown my device as introduced into an outer pipe 2 which may be a well casing. The device consists of an inner pipe or mandrel 3 connected by means of a collar 4 to a string of pipe which may be a drill stem or well tubing or other similar pipe of smaller diameter than the casing. Said mandrel 3 has between its ends a radially extending flange or abutment 5. This flange is of heavy construction adapted to withstand heavy blows. Below this flange the mandrel is provided with a downwardly tapered area threaded at 6 with a coarse lefthand thread to engage with the wedge member 7 upon the lower nipple 8. Below the threaded area 6 the pipe is extended downwardly for a desirable distance and provided at its lower end with a flange 9 formed by screwing a tubular nut upon the lower end of the mandrel. The wedge member is an expanding member which is intended to expand the pipe engaging jaws or dogs 10, said expander having an upper tapered area indicated at 11 tapered upwardly and threaded on its upper end to engage with the threaded area 6 on the mandrel. This thread 12 as previously stated is a coarse lefthand thread which is adapted to be disengaged with a few turns of the mandrel in a righthand direction. The lower end of the expanding member is threaded interiorly at 13 to engage with the upper end of a swaged nipple 14 which is reduced in outer diameter and connected to the pipe 15 by means of a coupling 16.

The jaws 10 previously referred to are formed at the lower ends of arms 17 which are extended upwardly along the mandrel and have their upper ends 18 formed into a segment of a circle adapted to surround the mandrel 3. They are held in assembled position upon the mandrel by a ring 19 which is set within an outer groove 20 in said ends 18. I have shown four of these jaws each of which is formed in the manner described although the number of jaws of course may be varied. The said jaws 10 are formed with upwardly inclined teeth 21 which are adapted to engage the interior of the casing 2 and resist upward movement of the tool relative to the casing in an obvious manner.

In assembling this device the expanding member 7 is screwed upon the tapered area 6 of the mandrel, the lower end of the mandrel extending below the lower end of the expanding member. The nut 9 is then screwed upon the lower end of the mandrel and the jaws 10 are assembled around the mandrel above the tapered area 11 with their upper ends extending above the upper end of the mandrel 3. This allows the ends to be brought inwardly in close engagement with each other so that the ring 19 may be slipped down over the upper ends of the arms into position within the groove 20. The assembly is then slipped down over the upper end of the mandrel and the coupling collar 4 may be secured in place. The rest of the device may be connected up as desired.

Figures 4, 5, 6:
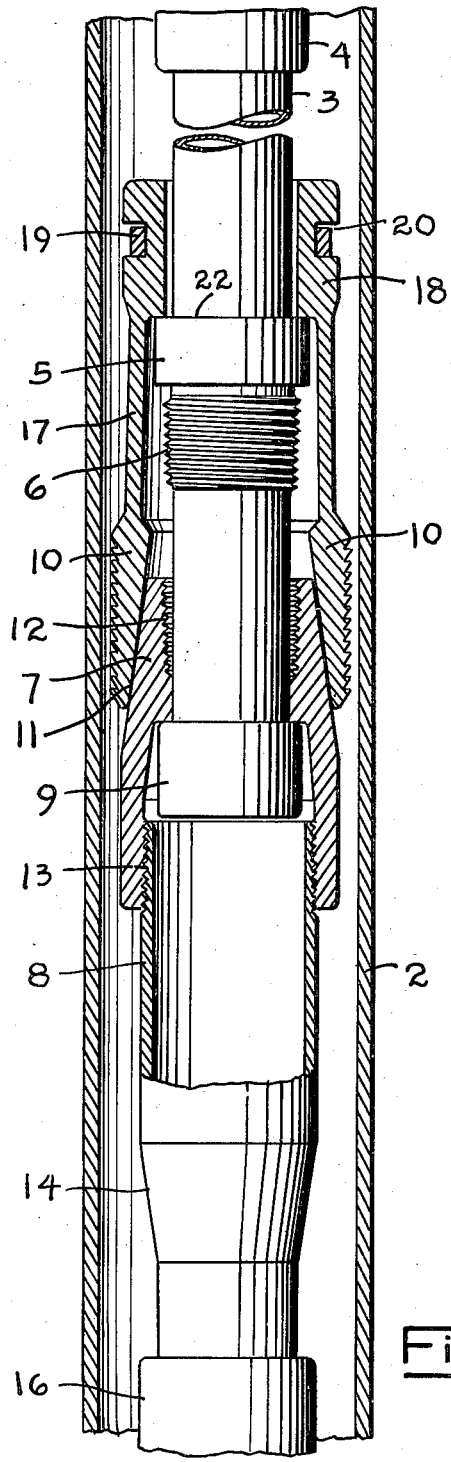
Fig. 4 is a view similar to Fig. 1 but in which the parts are shown in different relative positions.
Fig. 5 is a transverse section on the plane 5—5 of Fig. 6.
Fig. 6 is a broken detail of a slightly different embodiment of the invention.

When the device is introduced into the well it is connected in the form shown in Fig. 1 and as the device is moved downwardly into the well the pipe engaging jaws will move upwardly along the tapered area and will not engage the pipe to resist the downward movement. When the proper position in the well is obtained where the dogs are to engage the pipe an upward jerk upon the mandrel will cause the jaws to be wedged between the tapered area and the pipe and prevent the mandrel from being drawn upwardly relative to the pipe. If the casing is to be pulled an upward strain upon the pipe and mandrel will engage the casing and pull it upwardly so as to remove the same from the well. If, however, the casing is found to be stuck or cemented in the well so that it can not be pulled the device may be released from the casing. This is done by a righthand rotation of the mandrel which acts to screw the mandrel upwardly out of engagement with the expanding member 7. When this thread has been released the upper shoulder upon the flange 5, which may be designated at 22, will engage with the lower shoulder 23 at the upper ends of the arms 17. This flange may be employed to strike a series of blows upon the arms to pull the jaws upwardly out of engagement with the casing. The parts will then assume the position shown in Fig. 4. The weight of the lower portion of the pipe below the spear will be suspended upon the flange or collar 9 as shown and with the jaws held out of wedging engagement with the expanding member 7 no seizing of the casing will occur and the device may be withdrawn from the well.

Figure 3:
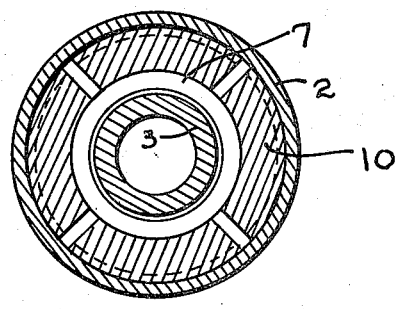
Fig. 3 is a similar section on the plane 3—3 of Fig. 1.

In the embodiment of the invention shown in Figs. 1 to 4 inclusive the interior of the jaws or dogs 10 are rounded as shown in Fig. 3 so that they conform to the conical outer surface of the expanding member 7. In order to provide positively against the rotation of the expanding member 7 within the jaws 10 I may form the tapered area in plane surfaces shown at 24 in Fig. 6, and the inner surfaces 25 of the jaws 10' may be also plane surfaces adapted to engage the areas 24 upon the expanding member. When this expedient is adopted it will be noted that relative rotation of the expanding member within the jaws, when said jaws are in wedged position, will be prevented. The unscrewing of the mandrel from the expanding member will thus be more positively assured.

While I have described this device as being particularly adapted for use as a spear mounted upon a tubular pipe or mandrel it is also adapted generally to anchor an inner pipe within an outer pipe or casing. It will be obvious that my device may be used to anchor a well tubing in the casing or it may be used in connection with a packer to prevent the packer sleeve from being moved upwardly. I wish it understood therefore that the device may be used as an anchoring means to prevent the inner pipe from upward movement relative to an outer pipe for whatever purpose this may be used.

An important advantage of the present construction is the simple manner in which the device may be released; by a simple righthand rotation of the pipe and mandrel the parts may be disengaged and then blows may be struck upon the anchoring jaws 10 so as to positively free them from engagement with the expanding member. This is a feature of importance.

What I claim as new is:

1. A pipe pulling spear comprising a mandrel, a collar integral with mandrel intermediate the ends thereof, a jaw assembly slidably mounted upon the mandrel above the collar, and having a downwardly facing shoulder thereon, said assembly including jaws extending downwardly along the mandrel, a threaded area on the mandrel below said collar, an expander member threadably engaging said area to normally support the jaws in an operative position and slidable relative to the mandrel when the threaded connection is disengaged so that the collar may be drawn upwardly against the jaws to release them from the expander.

2. A pipe pulling spear comprising a hollow mandrel, a collar integral with the mandrel intermediate its ends, a jaw assembly slidably mounted upon the mandrel above the collar and having a downwardly facing shoulder thereon, said assembly including jaws extending downwardly along the mandrel, an expander member releasably engaging the mandrel below the collar to normally support the jaws in operative position and slidable relative to the mandrel when released therefrom so that the collar may be drawn upwardly against the shoulder on the jaws to release them from the expander and means on the mandrel for lifting the expander member when the mandrel and jaw assembly have been lifted a predetermined distance.

GRANVILLE A. HUMASON.